US012431099B1

(12) United States Patent
Paolucci et al.

(10) Patent No.: US 12,431,099 B1
(45) Date of Patent: Sep. 30, 2025

(54) CHARGE CANCELLATION TO MINIMIZE TRANSIENT RIPPLE

(71) Applicant: Apple Inc., Cupertino, CA (US)

(72) Inventors: Jonathan D Paolucci, Santa Clara, CA (US); Jingdong Chen, San Jose, CA (US); Jason N Gomez, Campbell, CA (US); Yanhui Xie, Cupertino, CA (US); Nathan Y Tang, Oakland, CA (US); Kevin Ho, San Jose, CA (US); Bo Xu, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/897,513

(22) Filed: Sep. 26, 2024

(51) Int. Cl.
*G09G 3/3291* (2016.01)

(52) U.S. Cl.
CPC ... *G09G 3/3291* (2013.01); *G09G 2300/0819* (2013.01); *G09G 2310/0291* (2013.01); *G09G 2320/0209* (2013.01); *G09G 2320/0219* (2013.01); *G09G 2320/0223* (2013.01); *G09G 2330/028* (2013.01)

(58) Field of Classification Search
CPC ......... G09G 3/3291; G09G 2300/0819; G09G 2310/0291; G09G 2320/0219; G09G 2320/0209; G09G 2320/0223; G09G 2330/028
USPC .......................................................... 345/55
See application file for complete search history.

(56) References Cited

U.S. PATENT DOCUMENTS

| | | | | |
|---|---|---|---|---|
| 6,252,566 | B1 | 6/2001 | Maurice | |
| 9,379,600 | B2 * | 6/2016 | Yokou | H02M 7/003 |
| 2006/0208971 | A1 * | 9/2006 | Deane | G09G 3/3233 345/76 |
| 2007/0126728 | A1 * | 6/2007 | Peng | G09G 3/3233 345/211 |

(Continued)

FOREIGN PATENT DOCUMENTS

| | | |
|---|---|---|
| JP | 6175618 A | 12/1992 |
| KR | 813097 B1 | 3/2008 |

(Continued)

OTHER PUBLICATIONS

Choi et al.; "5-1: Student Paper: Implementation of Full-Panel Circuit Models for Interference Estimation Between Touch and Display Operation in On-Cell Touch AMOLED"; SID Symposium Digest of Technical Papers. vol. 53. No. 1. Jun. 28, 2022 [retrieved from: https://doi.org/10.1002/sdtp.15406].

*Primary Examiner* — Tom V Sheng
(74) *Attorney, Agent, or Firm* — FLETCHER YODER PC

(57) ABSTRACT

A charge injection circuit for use in display system of an electronic device can include an injection capacitance and circuitry that receives an input signal corresponding to drive signals from a display driver of the display system; and generates an inverted output signal corresponding to the drive signals for delivery to a power input of a display panel of the display system via the injection capacitance, thereby mitigating transient disruption of one or more power rails of the display panel associated with parasitic capacitive coupling of the drive signals to the one or more power rails of the display panel. The injection capacitance can be a capaci- (Continued)

tor having a capacitance value corresponding to a total parasitic capacitance capacitively coupling data lines to the one or more power rails within the display panel.

21 Claims, 7 Drawing Sheets

(56) References Cited

U.S. PATENT DOCUMENTS

| | | | | |
|---|---|---|---|---|
| 2007/0257732 | A1 | 11/2007 | Farrar et al. | |
| 2012/0212286 | A1* | 8/2012 | Yokou | H02M 7/003 327/535 |
| 2012/0293478 | A1 | 11/2012 | Chaji et al. | |
| 2014/0152380 | A1* | 6/2014 | Yokou | H02M 7/003 327/535 |
| 2016/0275850 | A1* | 9/2016 | Zheng | G09G 3/32 |
| 2017/0256207 | A1 | 9/2017 | Takahashi | |
| 2020/0326741 | A1* | 10/2020 | Hwang | G05F 3/262 |
| 2021/0118348 | A1* | 4/2021 | Park | G09G 3/3696 |
| 2021/0158731 | A1 | 5/2021 | Hu et al. | |
| 2023/0266842 | A1 | 8/2023 | Cho et al. | |
| 2024/0161694 | A1* | 5/2024 | Hsiao | G09G 3/3291 |
| 2025/0048002 | A1* | 2/2025 | Ebihara | H04N 25/78 |

FOREIGN PATENT DOCUMENTS

| | | | |
|---|---|---|---|
| KR | 2014086510 | A | 12/2012 |
| KR | 2017078979 | A | 7/2017 |

* cited by examiner

CHARGE CANCELLATION TO MINIMIZE TRANSIENT RIPPLE

BACKGROUND

Some display panels, such as organic light emitting diode (OLED) display panels may have significant parasitic coupling capacitance from the VDATA lines that drive the display pixels to other power and/or signal rails in the display panel. Various components of the display system may have differing degrees of sensitivity to AC and/or DC disturbances on these power and/or signal rails. Signals that exhibit fast transients can, in at least some cases, cause significant voltage disturbances on these rails, resulting in display errors.

SUMMARY

Thus, it may be desirable to provide circuits and systems that mitigate the effects of voltage disturbances that couple from the display drive signals to various power and/or signal rails of the display and display system.

A display system for an electronic device can include a power supply that supplies power to a display panel via a power delivery network. The display panel can further include one or more power rails that receives power from the power supply at a power input of the display panel via the power delivery network; row programming circuitry that receives drive signals from a display driver; and a plurality of data lines connecting the row programming circuitry to pixels of the display panel, wherein the data lines are capacitively coupled to the one or more power rails via parasitic capacitance associated with the layout of the display panel. The display system can further include a charge injection circuit coupled to the power input of the display panel by an injection capacitance, wherein the charge injection circuit receives an input signal corresponding to the drive signals from the display driver and generates an inverted output signal that is delivered to the power input of the display panel via the injection capacitance.

The power supply can include a power management integrated circuit. The injection capacitance can be a capacitor having a capacitance value corresponding to a total parasitic capacitance capacitively coupling the data lines to the one or more power rails. The power delivery network can include an output capacitor located near the power input of the display panel.

The charge injection circuit can include one or more amplifiers that convert the input signal corresponding to the drive signals from the display driver to the inverted output signal that is delivered to the power input of the display panel via the injection capacitance. The one or more amplifiers can include a first amplifier that is a unity gain inverting buffer amplifier followed by a second amplifier that is an inverting amplifier having a tunable non-unity gain.

The charge injection circuit comprises a switched capacitor circuit. The switched capacitor circuit can include a first switch selectively coupling a first power rail voltage to a switch node, wherein the switch node is coupled to the injection capacitance; a second switch selectively coupling a second power rail voltage to the switch node; a third switch selectively coupling a ground voltage to the switch node; and charge injection controller circuitry. The charge injection controller circuitry can receive the input signal corresponding to the drive signals from the display driver; generate a switching profile that will generate a desired injection voltage by selectively coupling the first power rail voltage, second power rail voltage, and ground to the switch node; and supply the drive signals corresponding to the switching profile to the first, second, and third switches.

The switched capacitor circuit can include a plurality of switching half bridges, each switching half bridge further having a high side switch coupled to a power rail, a low side switch coupled to ground, and a switch node at a junction of respective high side and low side switches; a plurality of injection capacitors each having a first terminal coupled to a respective switch node and a second terminal coupled to the power input of the display panel; and charge injection controller circuitry. The charge injection controller circuitry can receive the input signal corresponding to the drive signals from the display driver; generate a switching profile that will generate a desired injection voltage by selectively coupling each of the plurality of injection capacitors to the power rail or ground; and supply the drive signals corresponding to the switching profile to the plurality of switching half bridges. The plurality of injection capacitors can have weighted capacitance values. The weights can be binary weights that increase a base capacitance value by factors of two.

A charge injection circuit for use in display system of an electronic device can include an injection capacitance and circuitry that receives an input signal corresponding to drive signals from a display driver of the display system; and generates an inverted output signal corresponding to the drive signals for delivery to a power input of a display panel of the display system via the injection capacitance, thereby mitigating transient disruption of one or more power rails of the display panel associated with parasitic capacitive coupling of the drive signals to the one or more power rails of the display panel. The injection capacitance can be a capacitor having a capacitance value corresponding to a total parasitic capacitance capacitively coupling data lines to the one or more power rails within the display panel.

The charge injection circuit can include one or more amplifiers that convert the input signal corresponding to the drive signals from the display driver to the inverted output signal that is delivered to the power input of the display panel via the injection capacitance. The one or more amplifiers can include a first amplifier that is a unity gain inverting buffer amplifier followed by a second amplifier that is an inverting amplifier having a tunable non-unity gain.

The charge injection circuit can include a switched capacitor circuit. The switched capacitor circuit can include a first switch selectively coupling a first power rail voltage to a switch node, wherein the switch node is coupled to the injection capacitance; a second switch selectively coupling a second power rail voltage to the switch node; a third switch selectively coupling a ground voltage to the switch node; and charge injection controller circuitry that receives the input signal corresponding to the drive signals from the display driver; generates a switching profile that will generate a desired injection voltage by selectively coupling the first power rail voltage, second power rail voltage, and ground to the switch node; and supplies the drive signals corresponding to the switching profile to the first, second, and third switches.

The switched capacitor circuit can include a plurality of switching half bridges each switching half bridge further including a high side switch coupled to a power rail, a low side switch coupled to ground, and a switch node at a junction of respective high side and low side switches; a plurality of injection capacitors each having a first terminal coupled to a respective switch node and a second terminal coupled to the power input of the display panel; and charge injection controller circuitry that receives the input signal corresponding to the drive signals from the display driver; generates a switching profile that will generate a desired injection voltage by selectively coupling each of the plurality of injection capacitors to the power rail or ground; and supplies drive signals corresponding to the switching profile to the plurality of switching half bridges. The plurality of injection capacitors can have weighted capacitance values. The weights can be binary weights that increase a base capacitance value by factors of two.

A display system for an electronic device can include a power supply that supplies power to a display panel via a power delivery network. The display panel can further include one or more power rails that receives power from the power supply at a power input of the display panel via the power delivery network; row programming circuitry that receives drive signals from a display driver; and a plurality of data lines connecting the row programming circuitry to pixels of the display panel, wherein the data lines are capacitively coupled to the one or more power rails via parasitic capacitance associated with the layout of the display panel; and means for receiving an input signal corresponding to the drive signals from the display driver and generating an inverted output signal that is delivered to the power input of the display panel.

DETAILED DESCRIPTION

Figure 1:
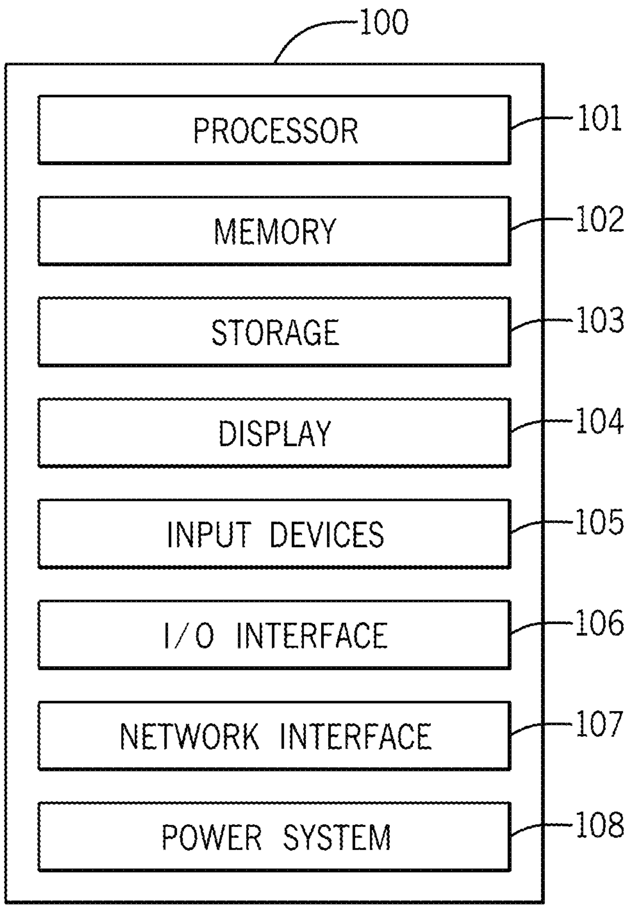
FIG. 1 illustrates a block diagram of an electronic device.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 is a block diagram of an electronic device 100, according to embodiments of the present disclosure. The electronic device 100 may include, among other things, one or more processors 101 (collectively referred to herein as a single processor for convenience, which may be implemented in any suitable form of processing circuitry), memory 102, nonvolatile storage 103, a display 104, input devices 105, an input/output (I/O) interface 106, a network interface 107, and a power system 108. The various functional blocks shown in FIG. 1 may include hardware elements (including circuitry), software elements (including machine-executable instructions), or a combination of both hardware and software elements (which may be referred to as logic). The processor 101, memory 102, the nonvolatile storage 103, the display 104, the input devices 105, the input/output (I/O) interface 106, the network interface 107, and/or the power system 108 may each be communicatively coupled directly or indirectly (e.g., through or via another component, a communication bus, a network, etc.) to one another to transmit and/or receive data amongst one another. It should be noted that FIG. 1 is merely one example of a particular implementation and is intended to illustrate the types of components that may be present in the electronic device 100.

By way of example, the electronic device 100 may include any suitable computing device, including a desktop or laptop/notebook, a portable electronic or handheld electronic device such as a wireless electronic device or smartphone, a tablet computer, a wearable electronic device such as a smart watch or head mounted display, and other similar devices.

Processor 101 and other related items in FIG. 1 may be embodied wholly hardware or by hardware programmed to execute suitable software instructions. Furthermore, the processor 101 and other related items in FIG. 1 may be a single contained processing module or may be incorporated wholly or partially within any of the other elements within the electronic device 100. Processor 101 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. Processor 101 may include one or more application processors, one or more baseband processors, or both, and perform the various functions described herein.

In the electronic device 100 of FIG. 1, processor 101 may be operably coupled with a memory 102 and a nonvolatile storage 103 to perform various algorithms. Such programs or instructions executed by processor 101 may be stored in any suitable article of manufacture that includes one or more tangible, computer-readable media. The tangible, computer-readable media may include the memory 102 and/or the nonvolatile storage 103, individually or collectively, to store the instructions or routines. The memory 102 and the nonvolatile storage 103 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by processor 101 to enable the electronic device 100 to provide various functionalities.

In certain embodiments, the display 104 may facilitate users to view images generated on the electronic device 100. In some embodiments, the display 104 may include a touch screen, which may facilitate user interaction with a user interface of the electronic device 100. Furthermore, it should be appreciated that, in some embodiments, the display 104 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input devices 105 of the electronic device 100 may enable a user to interact with the electronic device 100 (e.g., pressing a button to increase or decrease a volume level). The I/O interface 106 may enable the electronic device 100 to interface with various other electronic devices, as may the network interface 107. In some embodiments, the I/O interface 106 may include an I/O port for a hardwired connection for charging and/or content manipulation using a standard connector and protocol, such as a universal serial bus (USB), or other similar connector and protocol. The network interface 107 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a 3$^{rd}$ generation (3G) cellular network, universal mobile telecommunication system (UMTS), 4$^{th}$ generation (4G) cellular network, long term evolution (LTE®) cellular network, long term evolution license assisted access (LTE-LAA) cellular network, 5$^{th}$ generation (5G) cellular network, and/or New Radio (NR) cellular network, a 6$^{th}$ generation (6G) or greater than 6G cellular network, a satellite network, a non-terrestrial network, and so on. In particular, the network interface 107 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 107 of the electronic device 100 may allow communication over the aforementioned networks (e.g., 5G, Wi-Fi, LTE-LAA, and so forth).

The network interface 107 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

The power system 108 of the electronic device 100 may include any suitable source of power, such as a rechargeable battery (e.g., a lithium ion or lithium polymer (Li-poly) battery) and/or a power converter, including a DC/DC power converter, an AC/DC power converter, a power adapter (which may be external), etc.

Figure 2:
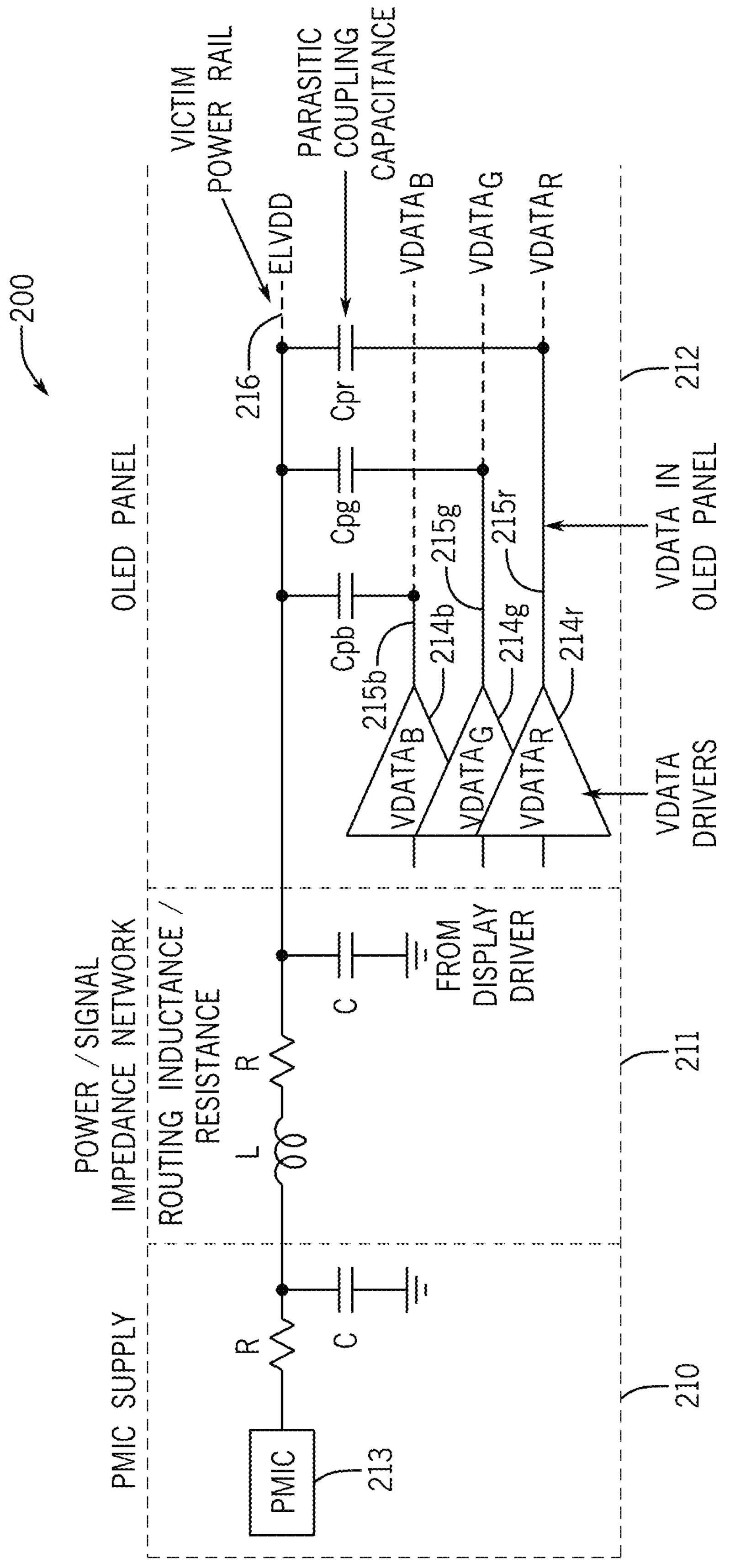
FIG. 2 illustrates a display system of an electronic device.

FIG. 2 illustrates a simplified schematic of a display system 200 of an electronic device. The display system can include a display panel 212, such as an OLED panel. Display panel 212 can be powered by a power supply 210. In some cases, power supply 210 can be implemented using a power management integrated circuit ("PMIC") 213, which can include switching devices and controller circuitry that can cooperate with external energy storage devices (such as inductors and capacitors) to implement a switching power supply. Various switching power supply topologies, such as buck converters, multi-phase buck converters, boost converters, buck-boost converters, switched capacitor converters, charge pumps, etc. may be implemented. In some cases, such as higher power applications, the switching devices may be external to the PMIC, with only the control circuitry being included therein. The external energy storage components are omitted from FIG. 2 for brevity, and the output of power supply 210 is modeled as an RC filter. Power supply 210 can be coupled to display panel 212 by a power delivery network 211, which can include any combination of wire, wiring harnesses, printed circuit board traces, flexible printed circuits, etc. that serve to connect the output of the power supply to the power inputs of the display panel.

As described above, in a display panel, such as an OLED panel, there can exist significant parasitic coupling capacitance from the row programming circuitry (represented by VDATA drivers **214*b*, 214*g*, 214*r*) that drives the respective pixels of the display and various power/signal rails within the panel, such as power rail ELVDD/216**, also described as a "victim" rail, as it may be disturbed by the VDATA signals. As but one nonlimiting example, VDATA may have a large dynamic range (e.g., 0-8V) and may traverse the full range in <1 μs. With such high dV/dt on VDATA, capacitive coupling between VDATA and victim power/signal rails may result in appreciable capacitive displacement current on these rails. This high displacement current combined with the finite impedance of the victim power/signal rails results in appreciable voltage disturbance.

FIG. 2 further illustrates an example of the VDATA coupling path to power rail ELVDD/216 in the OLED panel 212. As VDATA slews in amplitude, there exists a capacitor divider (Cpb, Cpg, Cpr) between the VDATA signals **215*b*, 215*g*, 215*r* and the victim rails (e.g., power rail ELVDD/216). Charge is transferred to power rail ELVDD/216 through the parasitic coupling capacitances Cpr, Cpg, Cpb between the red, green, and blue VDATA rails 215*r*, 215*g*, 215*b* and power rail ELVDD/216**, respectively. This transferred charge will result in a voltage perturbation on the ELVDD rail. Some of the voltage perturbation will be from the displacement current convolving with the power/signal rail impedance to produce a voltage. Some of the voltage perturbation will be from the displacement current being integrated by the power/signal rail filter capacitance to produce a voltage disturbance. These voltage disturbances are additive. Because VDATA is routed through a large percentage of the OLED panel, VDATA can have appreciable capacitive coupling to every power/signal rail in the panel.

Figure 3:
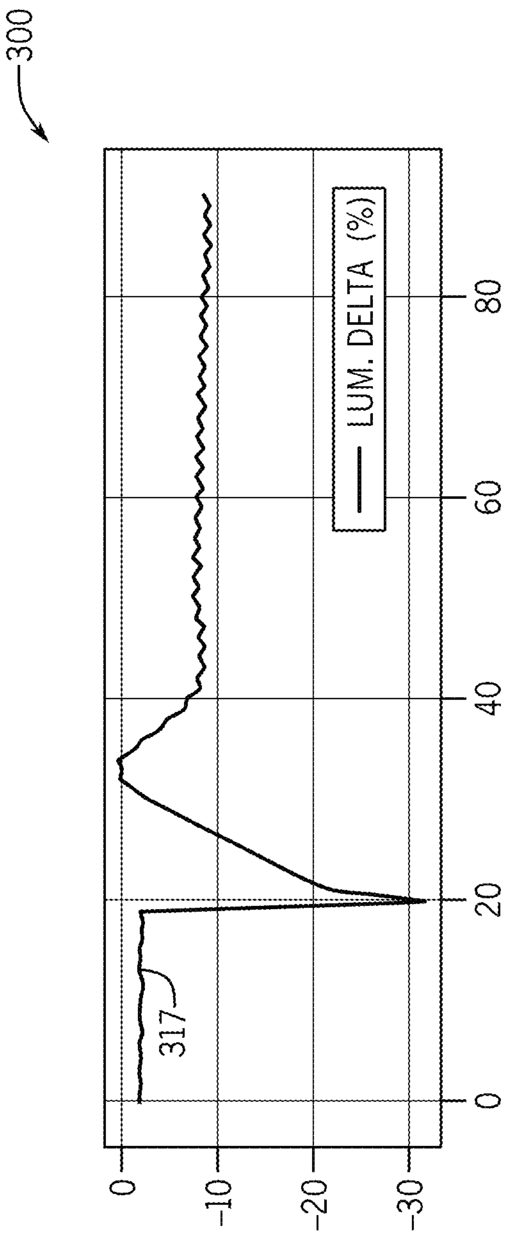
FIG. 3 is a plot illustrating error in an electronic display associated with transient voltages on a power supply rail of the display.

The display can have significant sensitivity to electrical disturbance on the victim power/signal rails across a broad range of frequencies, spanning from DC to multiple MHz. Sensitivity describes how the pixel circuit may exhibit luminance error from a AC and DC electrical disturbance. Luminance error in particular may be undesirable, as it may impair the displayed panel image. FIG. 3 is a plot 300 illustrating error 317 in an electronic display associated with transient voltages on a power supply rail of the display. FIG. 3 demonstrates that the luminance error can be higher than 30% due to the high voltage disturbance. This level of luminance error can be very visible on the screen, and thus mitigation techniques may be desirable.

Figure 4:
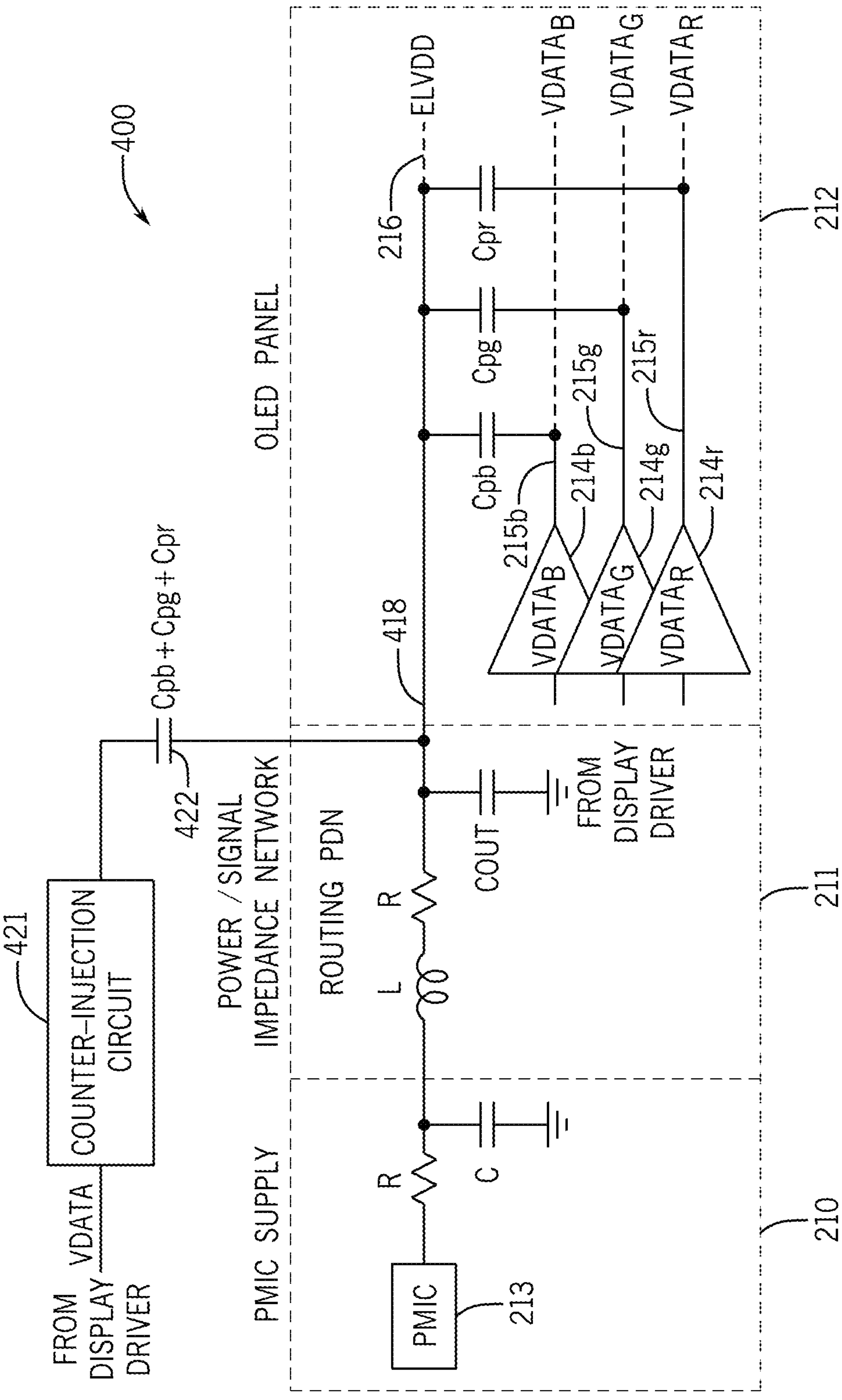
FIG. 4 illustrates a block diagram of an electronic device display system with charge cancellation/reverse charge injection to reduce electronic display error associated with transient voltages on a power supply rail of the display.

FIG. 4 illustrates a block diagram of an electronic device display system 400 with charge cancellation/reverse charge injection to reduce electronic display error associated with transient voltages on a power supply rail of the display. Display system 400 includes power supply 210, power delivery network 211, and display panel 212 as were discussed above with reference to FIG. 2 and which have like reference numbers. FIG. 4 also includes a counter injection circuit 421, examples of which are described in greater detail below, which is used in the charge cancellation scheme. In general, a reversed (inverted) replica of the VDATA-coupled charge can be injected onto the victim power/signal (e.g., power rail ELVDD/216) to cancel the disturbance induced from the original coupling. To that end, counter injection circuit 421 receives the VDATA signal from the display driver and generates a reversed/inverted copy of the signal that is injected into the victim rail. By this injection of opposite charge into the victim rail concurrently with VDATA-coupled charge impacting the victim rail, there can be zero or near-zero net charge on the victim rail. However, even partial cancellation can be beneficial, as the reduction in net charge on rail may result in residual luminance error that is less- or non-perceptible by a user.

In some embodiments, it may be preferable for the counter charge injection to occur at a point 418 that is downstream of the power delivery network 211, to reduce impedance effects associated with the effects associated with the power delivery network. Additionally, counter injection circuit 421 can be coupled to the display panel 212 by injection capacitor 422, which can have a value (e.g., Cpb+Cpg+Cpr) selected to correspond to the parasitic capacitances coupling the VDATA lines 215*b*, 215*g*, 215*r* to the victim rail (e.g., power rail ELVDD/216). Correspondence in this case means a relationship to the parasitic capacitance that allows for effective charge cancellation. For charge cancelation to be effective, the injection capacitance does not need to be equal to the parasitic capacitance, but the charge equation $Q=C*V$ must be satisfied. If the injection capacitance C is scaled relative to the parasitic capacitance, then the injection voltage (which is scaled and inverted relative to the DATA voltage) must be scaled so that DATA-coupled charge and reverse injection charge have the same magnitude. Finally, although the example illustrated in FIG. 4 describes reverse charge injection with respect to power rail ELVDD/216, the same technique can be applied to other power and/or signal rails within the display panel.

Figure 5:
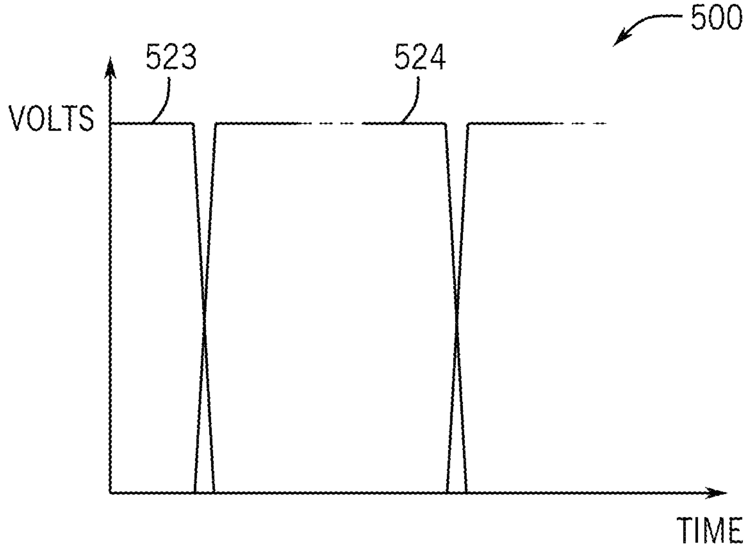
FIG. 5 illustrates charge cancellation/reverse charge injection voltages.

FIG. 5 illustrates charge cancellation/reverse charge injection voltages via a plot 500 of the VDATA signal 523 versus the reverse charge signal 524. Reverse charge signal 524 has an opposite magnitude as the VDATA signal 523. Thus, if the capacitance 422 coupling the reverse charge signal to the victim rail is the same as the parasitic capacitance between the VDATA line and the victim rail, then there should be near zero net charge injected into the victim rail. Alternatively, if charge injection circuit also scales the inverted VDATA signal to be injected, a corresponding inverse scale factor can be applied to the coupling capacitance 422.

Figure 6:
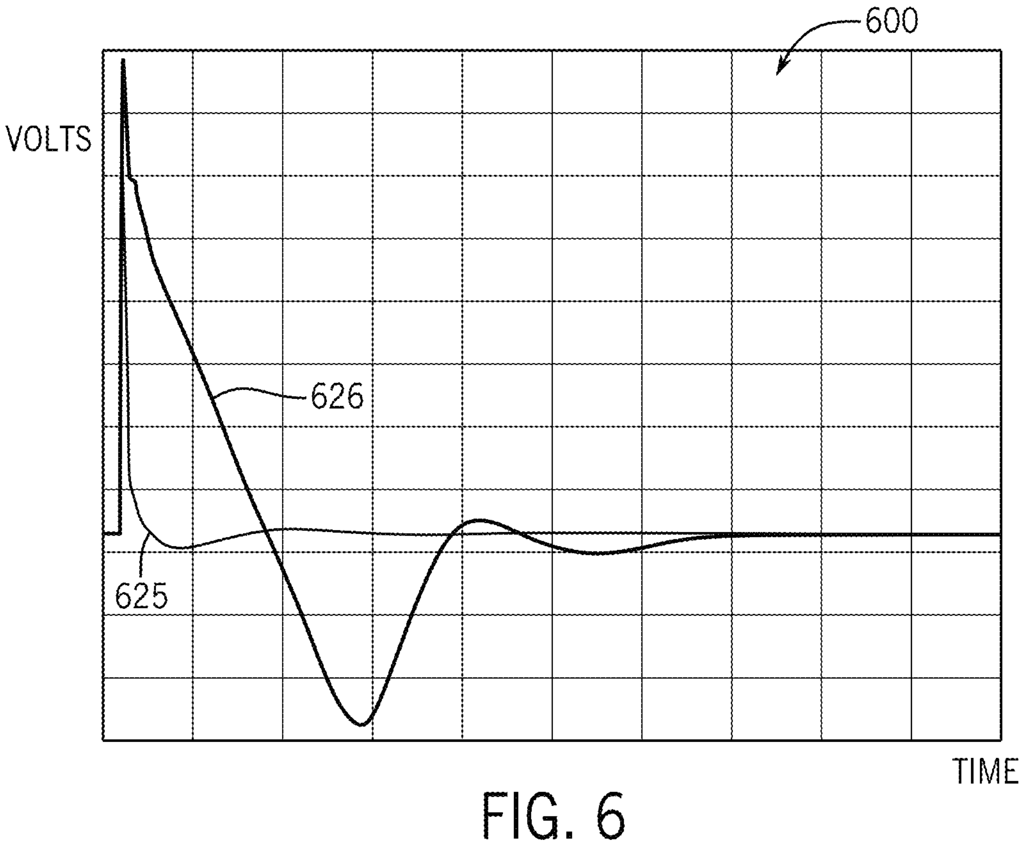
FIG. 6 illustrates simulated supply voltage disruption with and without charge cancellation/reverse charge injection.

FIG. 6 illustrates a plot 600 showing a simulated example of supply voltage disruption with and without charge cancellation/reverse charge injection. Trace 626 shows electrical perturbation of a power rail ELVDD/216 without reverse charge injection as described above. Trace 625 shows electrical perturbation of a power rail ELVDD/216 with reverse charge injection as described above. As can be seen from these plots, both the magnitude of the voltage disturbance (y-axis) and the duration of the voltage disturbance (x-axis) can be significantly reduced by employing the reverse charge injection techniques.

Figure 7:
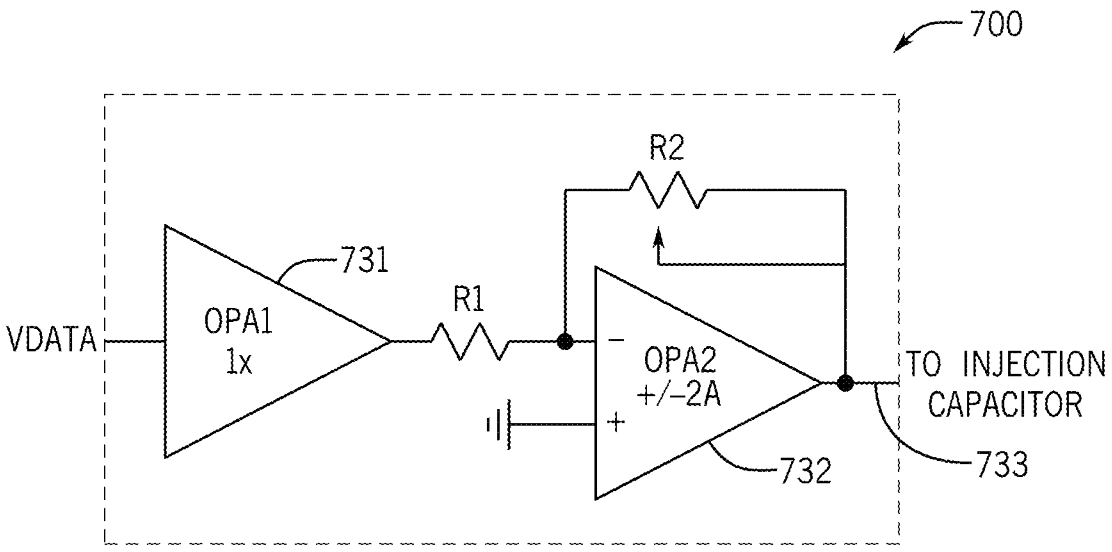
FIG. 7 illustrates a charge cancellation/reverse charge injection circuit based on amplifiers.

FIG. 7 illustrates a charge cancellation/reverse charge injection circuit 700 based on amplifiers. More specifically, A unity gain op-amp OPA1 731 can be used as a signal buffer, followed by an inverting op-amp OPA2 732 or high-speed buffer with adjustable gain (e.g., via resistor R2) to optimize the amount of charge to be dumped onto the victim rail via output 733 through the injection capacitor (e.g., FIG. 4, 422). The input of OPA1 731 can be either DC or AC coupled to the source of the VDATA signal, which can be the display driver circuitry. In some embodiments, OPA1 731 could have adjustable gain, followed by unit gain high speed op-amp or buffer as an equivalent variation. In still other embodiments, it may be desired to use a single inverting amplifier stage. The adjustable gain, which can be adjusted by variable resistor R2, as one example, can be tuned as part of the design of the system, e.g., by setting the gain to correspond to the parasitic capacitances of the panel and power rails with which it is to be used and/or the value of the coupling capacitance. In some embodiments, the gain could be adjusted by adaptive control circuitry, not shown, that can increase or decrease the gain as required responsive to transient disruptions occurring on the victim rail.

Figure 8:
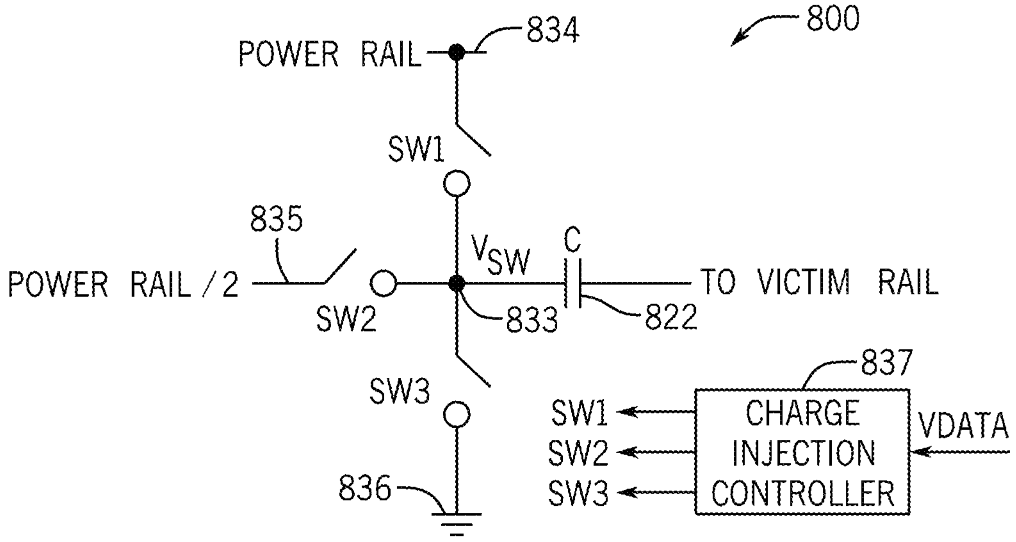
FIG. 8 illustrates a charge cancellation/reverse charge injection circuit based on a switched capacitor arrangement.

FIG. 8 illustrates a charge cancellation/reverse charge injection circuit 800 based on a switched capacitor arrangement that allows for a multi-level reverse charge injection scheme. Circuit 800 can use a plurality of switches, e.g., SW1, SW2, and SW3, and a corresponding capacitor 822 to perform controllable reverse-charge injection. More specifically, switch SW1 can selectively couple a first power rail 834 to a switch node 833 coupled to a first terminal of capacitor 822, which has its other terminal coupled to the victim rail. Similarly, switch SW2 can selectively couple a second power rail 835 to switch node 833, and switch SW3 can selectively couple a ground rail 836 to switch node 833. Under the direction of control circuitry 837, which can receive the display drive signal VDATA from the display driver and generate a corresponding switching profile, capacitor 822 can be selectively switched to deliver charge into or out of the victim rail. In the illustrated example, two power rails 834 and 835 are provided, with power rail 835 having a voltage one-half the voltage of power rail 834. However, in other embodiments, different numbers of power rails, including more or fewer power rails could be provided, depending on the particulars of the system and the desired performance.

Figure 9:
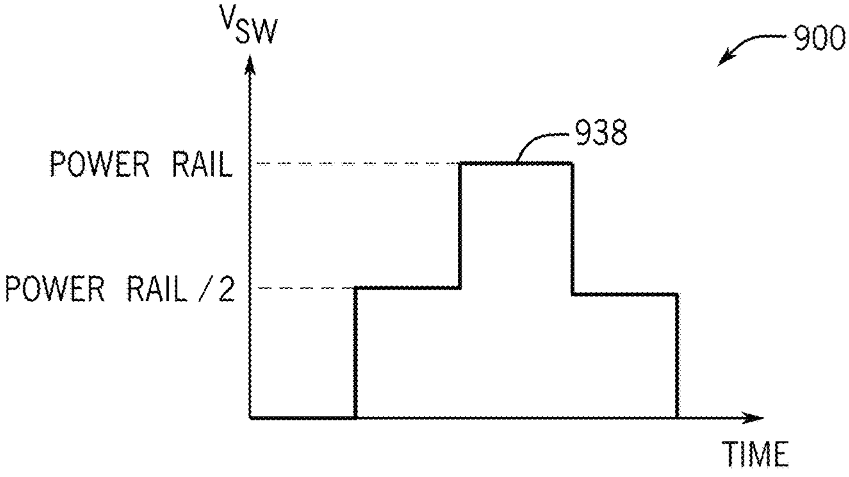
FIG. 9 illustrates a driving technique for a charge cancellation/reverse charge injection circuit based on a switched capacitor arrangement.

An example timing of the multi-level reverse charge injection is shown in FIG. 9, which illustrates a plot 900 of a curve 938 showing the switch node voltage Vsw appearing at switch node 833 over time. By selective operation of the switches, switch node voltage Vsw can be alternated between ground, and the available voltages, which, depending on the instantaneous voltage of the victim rail would have the effect of delivering charge to or pulling charge from the victim rail.

Figure 10:
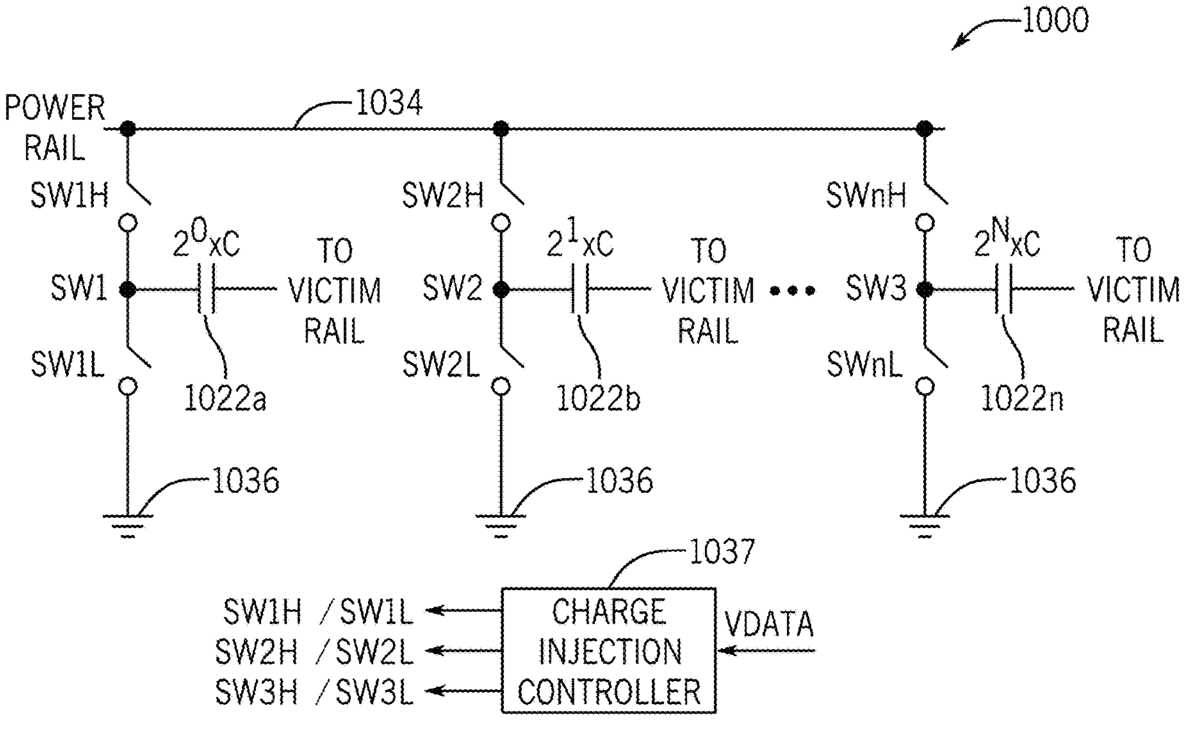
FIG. 10 illustrates a charge cancellation/reverse charge injection circuit based on a binary weighted switched capacitor arrangement.

FIG. 10 illustrates a charge cancellation/reverse charge injection circuit 1000 based on a binary weighted switched capacitor arrangement. Controllability of this circuit can be similar to other mixed signal techniques (e.g., digital to analog converters) in which a binary code results in a controlled amount of reverse-charge injection. More specifically, a plurality of capacitors (e.g., a number "n" of capacitors 1022*a*-1022*n*) having weighting values ranging from a base capacitance of C (capacitor 1022*a*) to 2C (capacitor 1022*b*) to $2^n$C (capacitor 1022*n*) can each have one terminal selectively coupled to either a power rail 1034 or ground 1036 by a switching half bridge SW1H/SW1L-SWnH/SWnL and the other terminal coupled to the victim rail. Under the direction of control circuitry 1037, which can receive the display drive signal VDATA from the display driver and generate a corresponding switching profile, the circuit can be selectively switched to deliver a desired amount of charge into or out of the victim rail.

Although illustrated as using a binary weighting, which may be convenient for digital control, other weightings, such as decade weighting, etc. could alternatively be used. In other embodiments, some or all of the high-side/low-side switch pairs SW1H/SW1L-SWnH/SWnL could be replaced by a plurality of switches and rails, as described above with respect to FIG. 8. This would create a circuit that would be a combination of FIG. 8 and FIG. 10. Such a hybrid arrangement could be configured to provide finer control of reverse charge injection, e.g., because the switch node voltage Vsw can be three levels instead of two as well as allowing for recycling of at least a portion of the transferred charge for higher operating efficiency.

The foregoing describes exemplary embodiments of power supply circuitry for display systems with reverse charge injection to reduce voltage transient ripple. Such configurations may be used in a variety of applications but may be particularly advantageous when used in conjunction with electronic devices such as desktop or notebook computers, smartphones, smartwatches, tablet computers, and the like. Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A display system for an electronic device, the display system comprising:

- a power supply that supplies power to a display panel via a power delivery network;
- wherein the display panel further comprises:
  - one or more power rails that receives power from the power supply at a power input of the display panel via the power delivery network;
  - row programming circuitry that receives drive signals from a display driver; and
  - a plurality of data lines connecting the row programming circuitry to pixels of the display panel, wherein the data lines are capacitively coupled to the one or more power rails via parasitic capacitance associated with the layout of the display panel;
- the display system further comprising a charge injection circuit coupled to the power input of the display panel by an injection capacitance, wherein the charge injection circuit receives an input signal corresponding to the drive signals from the display driver and generates an inverted output signal that is delivered to the power input of the display panel via the injection capacitance.

2. The display system of claim 1 wherein the power supply includes a power management integrated circuit.

3. The display system of claim 1 wherein the injection capacitance is a capacitor having a capacitance value corresponding to a total parasitic capacitance capacitively coupling the data lines to the one or more power rails.

4. The display system of claim 1 wherein the power delivery network comprises an output capacitor located near the power input of the display panel.

5. The display system of claim 1 wherein the charge injection circuit comprises one or more amplifiers that convert the input signal corresponding to the drive signals from the display driver to the inverted output signal that is delivered to the power input of the display panel via the injection capacitance.

6. The display system of claim 5 wherein the one or more amplifiers include a first amplifier that is a unity gain inverting buffer amplifier followed by a second amplifier that is an inverting amplifier having a tunable non-unity gain.

7. The display system of claim 1 wherein the charge injection circuit comprises a switched capacitor circuit.

8. The display system of claim 7 wherein the switched capacitor circuit comprises:

- a first switch selectively coupling a first power rail voltage to a switch node, wherein the switch node is coupled to the injection capacitance;
- a second switch selectively coupling a second power rail voltage to the switch node;
- a third switch selectively coupling a ground voltage to the switch node; and
- charge injection controller circuitry that:
  - receives the input signal corresponding to the drive signals from the display driver;
  - generates a switching profile that will generate a desired injection voltage by selectively coupling the first power rail voltage, second power rail voltage, and ground to the switch node; and
  - supplies the drive signals corresponding to the switching profile to the first, second, and third switches.

9. The display system of claim 7 wherein the switched capacitor circuit comprises:

- a plurality of switching half bridges each switching half bridge further comprising:
  - a high side switch coupled to a power rail;
  - a low side switch coupled to ground; and
  - a switch node at a junction of respective high side and low side switches;

a plurality of injection capacitors each having a first terminal coupled to a respective switch node and a second terminal coupled to the power input of the display panel; and charge injection controller circuitry that:

receives the input signal corresponding to the drive signals from the display driver;

generates a switching profile that will generate a desired injection voltage by selectively coupling each of the plurality of injection capacitors to the power rail or ground; and supplies the drive signals corresponding to the switching profile to the plurality of switching half bridges.

10. The display system of claim 9 wherein the plurality of injection capacitors have weighted capacitance values.

11. The display system of claim 10 wherein the weights are binary weights that increase a base capacitance value by factors of two.

12. A charge injection circuit for use in display system of an electronic device, the charge injection circuit comprising an injection capacitance and circuitry that:

receives an input signal corresponding to drive signals from a display driver of the display system; and generates an inverted output signal corresponding to the drive signals for delivery to a power input of a display panel of the display system via the injection capacitance, thereby mitigating transient disruption of one or more power rails of the display panel associated with parasitic capacitive coupling of the drive signals to the one or more power rails of the display panel.

13. The charge injection circuit of claim 12 wherein the injection capacitance is a capacitor having a capacitance value corresponding to a total parasitic capacitance capacitively coupling data lines to the one or more power rails within the display panel.

14. The charge injection circuit of claim 12 wherein the charge injection circuit comprises one or more amplifiers that convert the input signal corresponding to the drive signals from the display driver to the inverted output signal that is delivered to the power input of the display panel via the injection capacitance.

15. The charge injection circuit of claim 14 wherein the one or more amplifiers include a first amplifier that is a unity gain inverting buffer amplifier followed by a second amplifier that is an inverting amplifier having a tunable non-unity gain.

16. The charge injection circuit of claim 12 wherein the charge injection circuit comprises a switched capacitor circuit.

17. The charge injection circuit of claim 16 wherein the switched capacitor circuit comprises:

a first switch selectively coupling a first power rail voltage to a switch node, wherein the switch node is coupled to the injection capacitance;

a second switch selectively coupling a second power rail voltage to the switch node;

a third switch selectively coupling a ground voltage to the switch node; and charge injection controller circuitry that:

receives the input signal corresponding to the drive signals from the display driver;

generates a switching profile that will generate a desired injection voltage by selectively coupling the first power rail voltage, second power rail voltage, and ground to the switch node; and supplies the drive signals corresponding to the switching profile to the first, second, and third switches.

18. The charge injection circuit of claim 16 wherein the switched capacitor circuit comprises:

a plurality of switching half bridges each switching half bridge further comprising:

a high side switch coupled to a power rail;

a low side switch coupled to ground; and a switch node at a junction of respective high side and low side switches;

a plurality of injection capacitors each having a first terminal coupled to a respective switch node and a second terminal coupled to the power input of the display panel; and charge injection controller circuitry that:

receives the input signal corresponding to the drive signals from the display driver;

generates a switching profile that will generate a desired injection voltage by selectively coupling each of the plurality of injection capacitors to the power rail or ground; and supplies drive signals corresponding to the switching profile to the plurality of switching half bridges.

19. The charge injection circuit of claim 18 wherein the plurality of injection capacitors have weighted capacitance values.

20. The charge injection circuit of claim 19 wherein the weights are binary weights that increase a base capacitance value by factors of two.

21. A display system for an electronic device, the display system comprising:

a power supply that supplies power to a display panel via a power delivery network;

wherein the display panel further comprises:

one or more power rails that receives power from the power supply at a power input of the display panel via the power delivery network;

row programming circuitry that receives drive signals from a display driver; and a plurality of data lines connecting the row programming circuitry to pixels of the display panel, wherein the data lines are capacitively coupled to the one or more power rails via parasitic capacitance associated with the layout of the display panel; and means for receiving an input signal corresponding to the drive signals from the display driver and generating an inverted output signal that is delivered to the power input of the display panel.

* * * * *